(12) United States Patent
Kane

(10) Patent No.: US 11,584,305 B2
(45) Date of Patent: Feb. 21, 2023

(54) TRUCK BED SLIDABLE STORAGE SYSTEM

(71) Applicant: Robert Kane, Northport, NY (US)

(72) Inventor: Robert Kane, Northport, NY (US)

(*) Notice: Subject to any disclaimer, the term of this patent is extended or adjusted under 35 U.S.C. 154(b) by 263 days.

(21) Appl. No.: 17/000,016

(22) Filed: Aug. 21, 2020

(65) Prior Publication Data

US 2022/0055542 A1   Feb. 24, 2022

(51) Int. Cl.
*B60R 9/06* (2006.01)
*B60R 11/06* (2006.01)

(52) U.S. Cl.
CPC .............. *B60R 9/065* (2013.01); *B60R 11/06* (2013.01)

(58) Field of Classification Search
CPC ........... B60R 9/065; B60R 9/06; B60R 11/06; B60R 5/041; B62D 33/04; B62D 33/042; B60P 1/6427; B60P 7/08
USPC .............................................. 296/37.6, 26.09
See application file for complete search history.

(56) References Cited

U.S. PATENT DOCUMENTS

| | | | | |
|---|---|---|---|---|
| 2,788,137 A * | 4/1957 | Harkness | ................ | B60P 1/003 414/522 |
| 4,027,892 A * | 6/1977 | Parks | ................... | B60P 7/0892 410/121 |
| 4,305,695 A * | 12/1981 | Zachrich | ................ | B60R 11/06 414/522 |
| 4,917,429 A * | 4/1990 | Giger | ..................... | B60R 11/06 224/543 |
| 5,649,731 A * | 7/1997 | Tognetti | .................. | B60P 1/003 296/57.1 |
| 5,788,310 A * | 8/1998 | McKee | .................... | B60R 13/01 410/80 |
| 5,931,632 A * | 8/1999 | Dongilli | .................... | B60R 9/00 224/404 |
| 5,934,725 A * | 8/1999 | Bowers | ...................... | B60P 3/40 414/522 |
| 6,006,971 A * | 12/1999 | Coleman | ................... | B60R 9/00 224/310 |
| 6,328,364 B1 * | 12/2001 | Darbishire | ............. | B60P 1/003 296/39.2 |
| 6,601,899 B2 * | 8/2003 | Kiester | ................... | B62D 33/08 224/543 |
| 6,648,569 B2 * | 11/2003 | Douglass | .............. | B60P 7/0892 410/46 |
| 6,866,316 B1 * | 3/2005 | Harder | .................... | B60R 11/00 248/300 |

(Continued)

*Primary Examiner* — Joseph D. Pape
*Assistant Examiner* — Veronica M Shull
(74) *Attorney, Agent, or Firm* — John F. Vodopia

(57) ABSTRACT

A slidable storage system adapted for use in a pickup truck bed includes a substantially planar, slidable base. The base has a cab-side edge, at least first and second opposing substantially parallel side edges and a rear-access edge opposite and substantially in parallel to the cab-side edge. A base cab wall, at least first and second substantially opposing base sidewalls and a base rear access wall extend substantially perpendicularly up from the cab-side edge, the first and second opposing substantially parallel side edges and the rear-access edge, respectively, for a fixed height (H) forming a storage volume. Positioning the slidable storage system on the pickup truck bed, with the rear tailgate wall in an "up" position, the base will not slide past the rear tailgate wall and with the rear tailgate wall in a "down" position, the base slides out past the rear tailgate wall, enabling ready access.

18 Claims, 4 Drawing Sheets

(56) References Cited

U.S. PATENT DOCUMENTS

| | | | | |
|---|---|---|---|---|
| 6,921,120 B1* | 7/2005 | Ervin | ............... | B60P 3/40 |
| | | | | 296/26.05 |
| 8,240,527 B1* | 8/2012 | Casselton | ............... | B60R 9/065 |
| | | | | 224/404 |
| 8,317,442 B2* | 11/2012 | Daikuzono | ............... | B60P 7/14 |
| | | | | 410/121 |
| 8,840,166 B1* | 9/2014 | Derbes | ............... | B60R 5/041 |
| | | | | 224/403 |
| 2006/0065687 A1* | 3/2006 | Reed | ............... | B60P 1/003 |
| | | | | 224/404 |
| 2016/0107560 A1* | 4/2016 | Thygesen | ............... | B62D 33/08 |
| | | | | 296/37.6 |
| 2018/0118077 A1* | 5/2018 | Ferkul | ............... | B60R 9/065 |
| 2020/0406986 A1* | 12/2020 | Sosnowich | ............... | B62D 33/0207 |

* cited by examiner

TRUCK BED SLIDABLE STORAGE SYSTEM

BACKGROUND OF INVENTION

The present invention, relates broadly to storage units for truck beds, and more particularly relates to a truck bed slidable storage system that by its operation simplifies loading, organizing and unloading of the items stored in the truck bed slidable storage system, in a safe and convenient manner.

Sales of pick-up style trucks are at an all-time high. The popularity of the pick-up style truck ("pickup truck") as an everyday vehicle is more wide spread than it ever has been. Pick-up truck utility and convenience in hauling items coupled with the availability of luxury interiors and extended cab space have made the pickup truck a popular alternative to other vehicles.

Availability of aftermarket accessories, such as bed liners, also enhances the attractiveness of pickup trucks. But while bedliners protect the metal surfaces of the pickup truck bed, bedliners do little or nothing to improve the functionality or organizational abilities of the pickup truck bed. Usually, tools, materials, and other similar items are simply tossed in the bed space and left to slide back and forth, bedliner or not. But when the tune comes to retrieve such items, much time can be wasted looking for desired objects, and accessing the desired objects. Truck bed organizers have developed to better utilize pick-up truck bed space.

For example, U.S. Pat. No. 5,456,514 teaches a truck bed load organizer apparatus that includes a layer of flat belting material in which a plurality of panels is defined by a plurality of cuts. Each panel extends between the sides of the material and is pivotable from a down position to an up position (see FIGS. 2-5). The panels are pivoted to divide the cargo or bed area of the truck into any of a plurality of separate compartments for organizing goods or cargo or for holding the cargo in any or all of the various compartments. The panels are under tension in their up position due to the inherent properties of the material, and return to their down position as part of the layer material when goods which are positioned against them are removed.

While there are benefits to installing and using the known truck bed load organizer disclosed by the 514 patent, which operates as a panel apparatus and protector for truck bed, there are some inherent disadvantages. For example, once installed, the bed organizer is not readily removable from the pick-up truck, Nor does the bed organizer provide for separate compartments through the bed surface area, or volume. This conventional bed organizer does not enable ready and/or convenient access to items positioned in the pick-up truck bed.

US Published Application Serial No. 2002/0014505 discloses a storage structure including a storage unit adapted to be slidably coupled to a rear floor portion of a pickup truck. The storage unit includes a mounting structure and a cabinet slidably coupled to the mourning structure. The storage unit has a plurality of movable drawers disposed in the cabinet and positioned within the cabinet between a pair of cabinet sidewalls. The storage unit has a cover operatively connected to the cabinet, which is movable between an open position in which the drawers may be opened and a closed position in which the cover prevents the drawers from being opened. A cover latch associated with the cover allows the cover to be latched in its closed position. FIG. 15 shows an embodiment with a mounting, structure 240 that is mounted to the rear bed 212 and that slidably supports the storage unit 210, as shown. The storage unit, therefore, can slide from its position proximate the cab to the rear edge of the bed.

The patented storage unit structure, however, can slide only if there is nothing stored on the bed in its path. And the storage unit slides only to the end of the bed, and requires a mounting structure upon with the unit will slide. The mounting unit structure must be affixed to the truck sidewalls and/or truck bed surface.

U.S. Pat. No. 6,763,985 discloses a truck bed cargo stabilizer and organizer apparatus for storing, stabilizing and organizing items placed in the bed of a pickup truck. The truck bed cargo stabilizer and organizer apparatus comprises of a hollow structure for a bed of a pick-up truck having an upper portion and a lower portion forming a T-shape with a generally flat upper surface that includes a plurality of bucket receiving cylinders and a toolbox receiving cavity. While the truck bed cargo stabilizer and organizer apparatus does provide for cargo to sit properly in the respective cavities in which each are arranged within the structure, the apparatus does not slide, Hence, many of the cavities the cargo items positioned therein) are not readily accessible. Consequently, items positioned within the cavities are not readily accessible as the apparatus does not slide.

U.S. Pat. No. 8,070,029 discloses a truck bed, organizer identified therein as a truck bed companion. The truck bed companion is an organizer with multiple expansion joints to fit various sized truck beds, essentially compartmentalizing any truck bed. FIG. 1 shows a top view of the organizer 50 installed inside the truck bed 100, where two main beams 30 are shown running from the cab section of the truck to the back of the bed and passing proximate the bed's wheel wells 101, The center beam 32 is shown spanning a distance between two adjacent cross beams 31. A total of four cross beams 31 are shown in the FIG. 1 configuration. (FIGS. 1 and 2). The compartments thus formed keep groceries from spilling all over the truck bed, allow contractors to transport tools and sheets of plywood or drywall with ease, eliminate the need to ties down lawn mowers or gas cans and create separate areas for tool boxes, saws or other necessities. The organizer compartments, however, are not readily accessible and, the organizer itself is fixed and not meant to slide in and out of the truck bed.

Also known are "bedslide" slide-out systems, which essentially are bed drawers, or bed trays that slide in an out on drawer rail mechanisms. For example, the bedslide classic (sku: BSA-SKR; UPC: 856341006627) is a platform to access your truck bed space. A user grabs the handle, pulls, and the bedslide drawer out. The bedslide products, however, must have slide tracks permanently attached, with the drawer or tray slidingly attached thereto.

SUMMARY OF THE INVENTION

The present invention provides a truck bed slidable storage system that overcomes the shortcomings of the prior art.

The inventive truck bed slidable storage system is a versatile, customizable, rugged and low-cost piece of equipment that adds safety to pick-up trucks and convenience to pick-up truck owners who wish to more readily access items that might be stored in the pick-up truck bed.

The inventive truck bed slidable storage system is placed in the truck bed, with no pan permanently affixed, thereby avoiding the high costs associated with competitor truck bed organizer or storage systems that require drilling and bolting slide tracks into the bed of the truck, and typically incorporate one or more large sliding drawers. Known, permanently installed bed slidable storage systems result in limited load height, thereby limiting cargo by a draw height of about 10"-12," which cargo limitations limit other uses of the pick-up truck. That is, because these large sliding drawers are typically 10"-12" high, they limit the size of any further cargo that might be position on top as well as other uses of the truck bed. The inventive truck bed slidable storage system avoids this shortcoming.

Preferably, the truck bed slidable storage system includes a peg board pattern type of base, with full-length runners (approx. 1.5" high), combined with tongue and groove partitions that allow the internal bulkheads to be positioned to form compartments to accommodate the type and size of cargo to be transported. In addition, the perimeter walls of the truck bed slidable storage system base are shaped to fit into and complement the shapes of the wheel wells, and to brace up against the closed tailgate to secure and prevent the storage system base from sliding in response to lateral forces imposed on it as the truck moves. Such preferred construction allows for organizing the storage space in this area of the bed space to optimally accommodate just about any load contents. And while the inventive truck bed slidable storage system components may be made of wood, for example, cedar, they preferably are made of high density polyethene plastic (HDPE). HDPE is sufficiently flexible, rugged and relatively lightweight for various designs to meet the needs for different applications.

The inventive truck bed slidable storage system can be used to receive anything from grocery bags, a family's beach owing gear, such as folding, chairs, umbrellas, cooler, and miscellaneous other bags, tables, chairs, tools such as table and miter saws, air compressors, tool bags, cooler, etc. Additional smaller compartments can be formed to carry screws, nails and small tools, etc. The inventive truck bed slidable storage system gets the cargo out of the back seat and into the bed while providing easy access. Preferably, the system includes safety features such as fold down legs (once the leading edge is past the tailgate) and runaway strap that anchors the base (or the inventive system) to the front of the pick-up truck bed, for full extension. Lock down blocks also may be included to subdivide compartments formed using the bulkheads.

In an embodiment, the invention provides a slidable storage system adapted for use in a pickup truck bed, the truck bed connected to or otherwise bounded by a rearwardly-facing cab wall, first and second opposing substantially parallel vehicle sidewalls (to accommodate a broader width, etc., at a portion proximate the wheels swells, a rear tailgate wall opposite to and substantially in parallel with the rearwardly-facing cab wall. The rear tailgate wall is hingedly attached to the pickup truck bed and arranged in a "down" position for access to the pickup truck bed and in an "up" position to limit access to the pickup truck bed.

The slidable storage system comprises a substantially planar, slidable base formed with a cab-side edge (that abuts the rearwardly facing cab wall), first and second opposing substantially parallel inner side edges of equal length (L1), separated from each other by a width ($W_1$) equal to a length of the cab-side edge, first and second opposing substantially parallel outer side edges of equal length (L2), separated from each other by a width ($W_O$) equal to a length of a rear-access edge opposite and substantially in parallel to the cab-side edge. The base further includes a base cab wall, first and second substantially opposing base sidewalls and a base rear access wall that each extend substantially perpendicularly up from the cab-side edge, the first and second opposing substantially parallel side edges and the rear-access edge, respectively, for a fixed height (H).

The substantially planar, slidable base, the base cab wall, the first and second substantially opposing inner and outer base sidewalls and the base rear-access wall form a storage volume and, the slidable base is positioned on the pickup truck bed and is slid backwards so that the rear-access edge passes the rear tailgate wall for a limited distance, such that items stored on the slidable base are readily accessible from the base sides and rear extending out from the trucks bed. The base is slid forwards so the rear-access edge passes the rear tailgate wall allowing the rear tailgate wall to be raised to its "up" position.

The substantially planar slidable base includes an upper surface and a lower surface and wherein, substantially planar, rectangular dividing panels, operating as bulkheads, are detachably mounted on the upper surface to separate portions of the inner volume into compartments. The dividing panels comprise a base-contact edge, an upper edge opposite the base-contact edge, a left edge and a right edge, wherein, the base-contact edge is configured with one or more dowel pins extending from the base-contact edge substantially in parallel with a plane of the dividing panel and wherein, the substantially planar slidable base includes a pattern of openings adapted to receive the one or more dowel pins to fix the dividing panels to the planar slidable base. The left edges of the dividing panels are arranged with tongues and the opposing right edges of the dividing panels are arranged with grooves for receiving like tongues of other dividing panels.

The width of the cab-side edge (WI) and the rear access edge (WO) are between 36 and 66 inches, preferably between 48 and 60 inches, and an aggregate length (L1 and L2) of the first and second substantially opposing inner and outer side edges is between 60 and 96 inches, preferably between 72 and 84 inches. For that matter, the width of the cab-side edge (WI) is 48 inches, the rear access edge (WO) is about 59 inches and the aggregate length (L1 and L2)) of the first and second substantially opposing side edges is about 72 inches. As should be clear from the drawing figures, a width of the substantially planar, slidable base changes from the width of the cab-side edge (WI) to the width of the rear access edge (WO) at the first and second wheel-well structures.

The dividing panels may include handle sections, which operate as hand holds and bungee anchor points. Preferably, the perimeter or outer walls or base side walls include the handle sections. For that matter, the base cab wall includes a runaway safety strap that is detachably fixed to the pick-up truck to limit the length that the rear access edge of the substantially planar, slidable base can move out past the rear tailgate wall. Support legs are attached to the bottom surface of the substantially planar, slidable base, that are deployed to support. The storage system as it is slid out past the rear-access edge or rear tailgate wall. The support legs are deployed by pivoting the support legs ninety degrees from each support leg's respective non-deployed position.

The lower surface of the substantially planar, slidable base includes a plurality of runner strips arranged substantially in parallel to each other and the first and second opposing substantially parallel inner and outer side edges, and extending away from said lower surface for contacting and sliding on a surface of the pickup truck bed. The runner strips are made of high density polyethene plastic (HDPE), between 1 and 2 inches in height off the lower surface of the slidable base, but preferably 1 and ½ inch in height. The substantially planar, slidable base is made of high density polyethene plastic (HDPE).

The base cab wall, first and second substantially opposing base sidewalls and base rear access wall are made at least in part from materials selected from the group consisting of wood, metal, plastic and rubber, including high density polyethene plastic (HOPE). The fixed height (H) is between 8 and 15 inches, preferably 10 inches. Preferably, the substantially planar, slidable base comprises peg board pattern, and includes lock down blocks to subdivide compartments and help prevent shifting of heavier or bulky items. The first and second opposing substantially parallel inner and outer side edges of equal length (L1+L2) include first and second wheel-well structures extending towards a bed interior and each other.

BRIEF DESCRIPTION OF THE DRAWINGS

Further features and advantages of the invention will become apparent from the description of embodiments that follows, with reference to the attached figures, wherein.

DETAILED DESCRIPTION OF THE INVENTION

The following is a detailed description of example embodiments of the invention depicted in the accompanying drawings. The example embodiments are presented in such detail as to clearly communicate the invention and are designed to make such embodiments obvious to a person of ordinary skill in the art.

Figure 1:
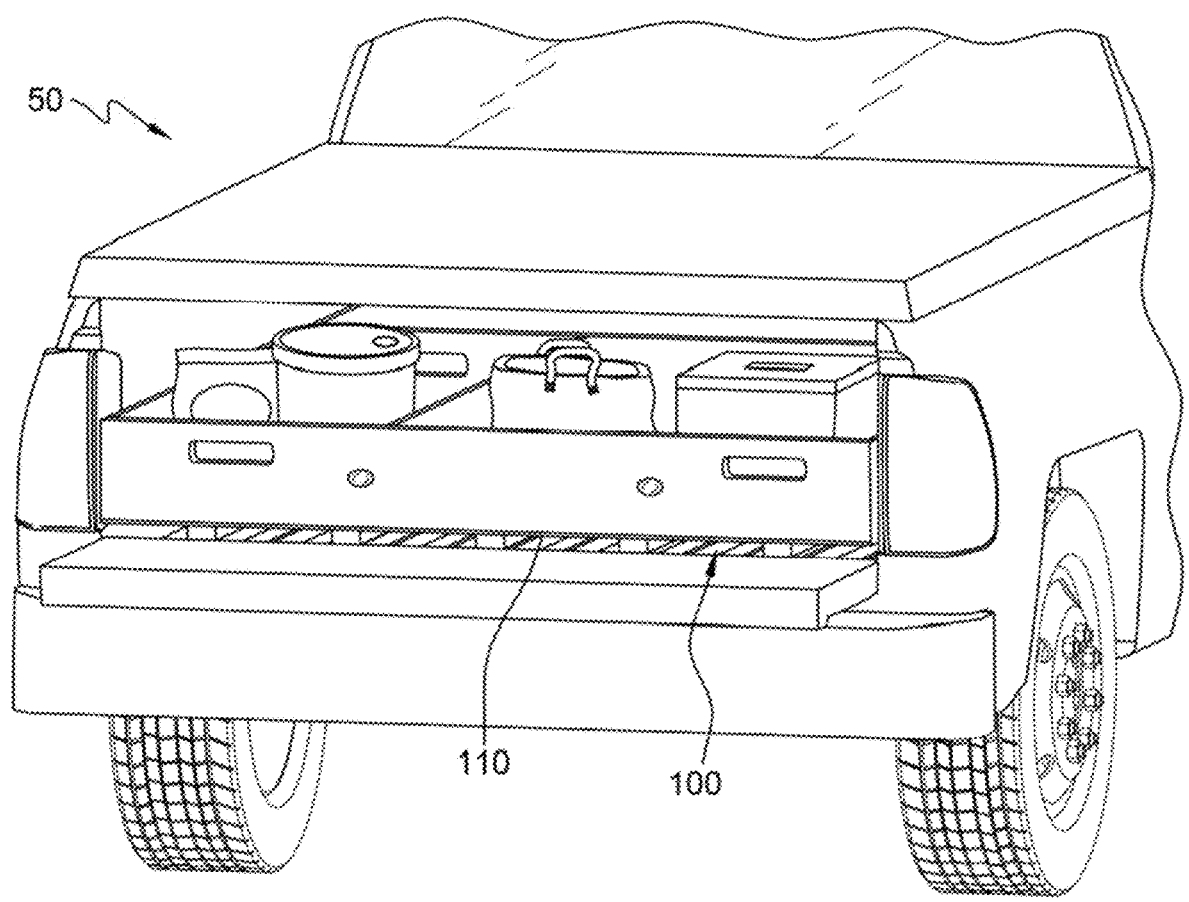
FIG. 1 presents a rear perspective view of a pickup truck where the inventive truck bed slidable storage system is arranged in a non-dployed position, with the rear tailgate (wall) in a down position.

FIG. 1 presents an exemplary embodiment of the inventive slidable storage system 100, adapted to be positioned for use in a bed of a pickup truck 50. As used herein, "bed of a pickup truck," or "pickup truck bed," means the flat, platform-like bed behind the driver's cab that extends from the driver's cab wall back to the rear edge of the pickup truck bed (or tailgate). The pickup truck bed is connected or otherwise appurtenant to a rearwardly-facing cab wall, first and second opposing substantially in parallel vehicle sidewalls, a rear tailgate wall opposite to and substantially parallel with the cab wall. The rear tailgate wall is hingedly attached to the pickup truck bed for bed access. As is known, the rear tailgate wall is arranged in a "down" position for access to the pickup truck bed and an "up" position to limit access to the pickup truck bed. As also is known, the pick-up truck typically will include first and second wheel-well structures to cover the rear wheels. The first and second wheel-well structures extend (from the respective vehicle sidewall) towards a bed interior (and each other), from respective first and second planar portions of the first and second opposing vehicle sidewalls.

Figure 2:
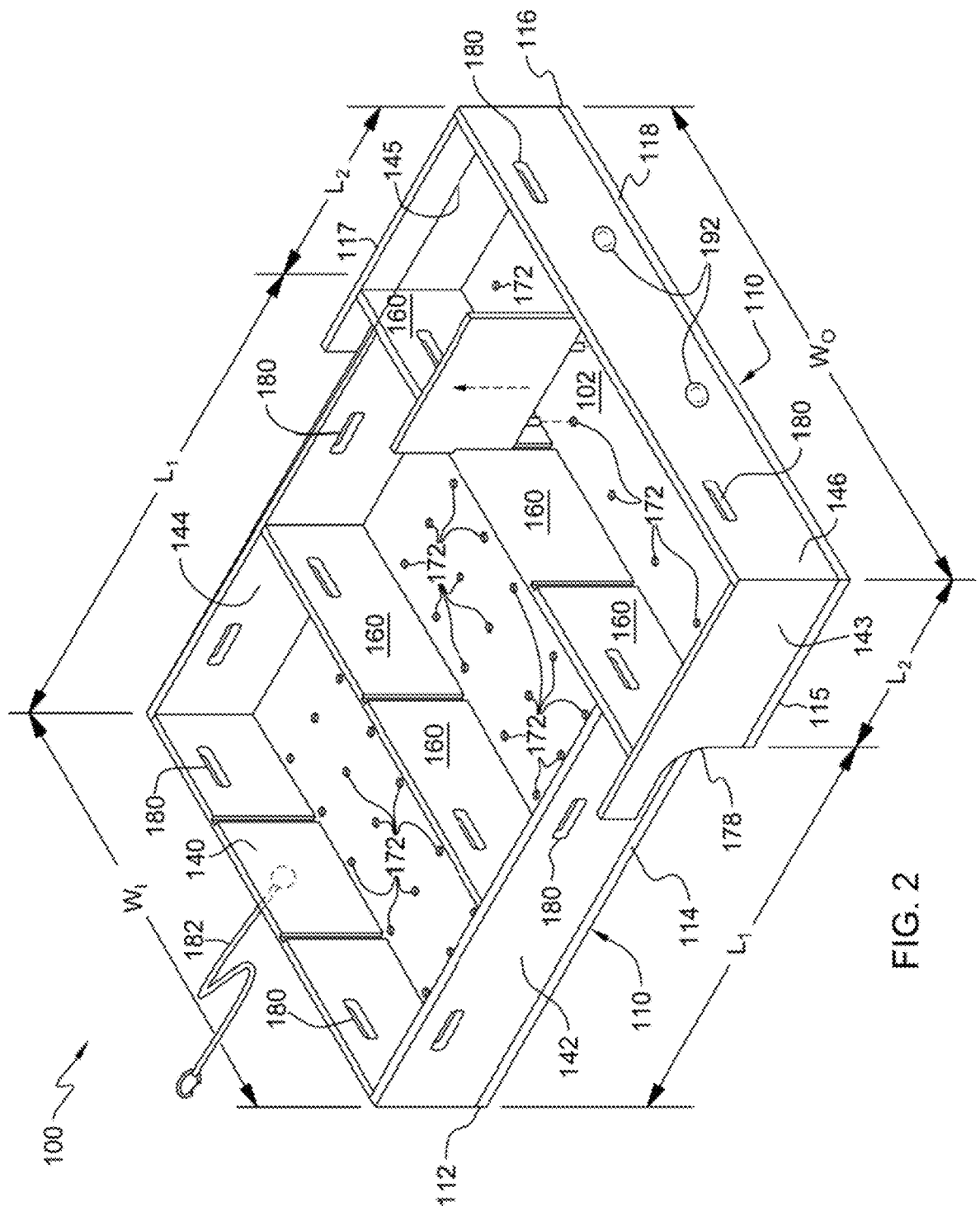
FIG. 2 presents top perspective view of the truck bed slidable storage system shown FIG. 1, in greater detail.

FIG. 2 presents a perspective view of the slidable storage system 100 of FIG. 1. As shown, the slidable storage system 100 includes a substantially planar, slidable base 110 formed with a cab-side edge 112, first 114 and second 116 opposing substantially parallel inner side edges, of equal length ($L_1$), separated from each other by a width ($W_I$) equal to a length of the cab-side edge 112, first 115 and second 117 opposing substantially parallel outer side edges, of equal length ($L_2$), separated from each other by a width ($W_O$) equal to a length of a rem-access edge 118. The rear-access edge 118 is opposite and substantially in parallel to the cab-side edge 112. The rear-access edge 118 is defined by a width ($W_O$), as shown. The widths of edges $W_1$ and $W_2$ are different as $W_O$ includes added width of the wheel wells.

The slidable base 110 includes an upper surface 102 and a lower surface 104 (FIG. 4A), and is placed in a position on the pickup truck bed from which the slidable base 110 can be slid backwards so that the rear-access edge 118 passes the rear tailgate wall for a limited distance. Typically, the inventive slidable storage system (i.e., base 110) has a footprint that covers most of the surface area of the pickup truck bed. In its deployed state, the inventive slidable storage system 100 provides ready access to items stored on the slidable base. Of course, after use, the slidable base 110 (that is, the entire slidable storage system 100) is slid forward so the rear-access edge 118 passes the rear tailgate wall allowing the rear tailgate wall to be raised to its "up" position.

The slidable storage system 100 also includes a base cab wall 140, first 142 and second 144 substantially opposing inner base sidewalls, first 143 and second 145 substantially opposing outer base sidewalls and a base rear access wall 146. Each of the walls extend substantially perpendicularly up from the cab-side edge 112, the first 114 and second 116 opposing substantially parallel inner side edges, first 115 and second 117 substantially opposing outer side edges and the rear-access edge 118, respectively, for a fixed height CFO. Please note that the system walls (140, 142, 143, 144, 145, 146), for example, the base cab wall 140, may comprise a single contiguous wall or a wall comprising a number of panels (as described below in greater detail). The substantially planar, slidable base. 110, the base cab wall 140, the first 142 and second 144 substantially opposing base inner sidewalls, first 143 and second 145 substantially opposing outer sidewalls and the base rear-access wall 146 form a storage volume, that may be open at the top.

The width ($W_1$) of the base at the cab-side edge 112 and the width ($W_0$) of the base at the rear access edge 118 are each between about 36 and 66 inches, preferably 48 to 60 inches (where $W_0 > W_1$), and the lengths of the first and second substantially opposing inner and outer side edges ($L_1+L_2$) are between about 60 and 96 inches, preferably 72 to 84 inches (where $L_1 > L_2$). Preferably, the width ($W_1$) of the cab-side edge is 48 inches. Preferably, the width ($W_0$) of the rear access edge is 59 inches. Preferably, the total length ($L_1+L_2$) of the first and second substantially opposing inner and outer side edges 114, 116; 115, 117 is 72 inches. A width of the substantially planar, slidable base changes from the width of the base ($W_1$) at the cab-side edge to the width ($W_0$) of the base at the rear access edge (reflecting the first and second wheel-well structures). Applicant prepared a working prototype. In the working prototype, the width $W_0$ is 59 inches, the width W1 is 50 inches, the length L1 is 54 inches, the length L2 is 20.5 inches, and the fixed height H is 5.5 inches.

Upon positioning the slidable storage system 100 onto the pickup truck bed, and arranging the rear tailgate wall of the pickup truck in an "up" position, the slidable storage system 100 will not slide past the rear tailgate wall 146/tear access edge 118, i.e., it is blocked so cannot slide off the back of the pickup truck, By arranging the rear tailgate wall 146 in a "down" position, the slidable storage system 100 will slide out past the rear tailgate wall, so that part of the slidable base 110 is supported by the pick-up truck bed and part of the slidable base is not supported by the pickup truck bed. In this way, a person is able to walk around a perimeter of the slidable storage system without being blocked by the pickup truck walls, etc., as is the case with convention pickup truck bed storage systems.

The slidable storage system 100 includes substantially planar, substantially rectangular dividing panels 160, operating as bulkheads. The dividing panels or bulkheads are detachably mounted on the upper surface 102 of the planar, slidable base 110 to separate portions of the inner volume into compartments. Not only can a user utilize the bulkheads (dividing panels) 160 to personalize storage sub-spaces (compartments), but separating items in a moving vehicle by bulkheads make for a much safer delivery than were the entire volume not separated, as known to those with ordinary skill in the art.

Figure 3A:
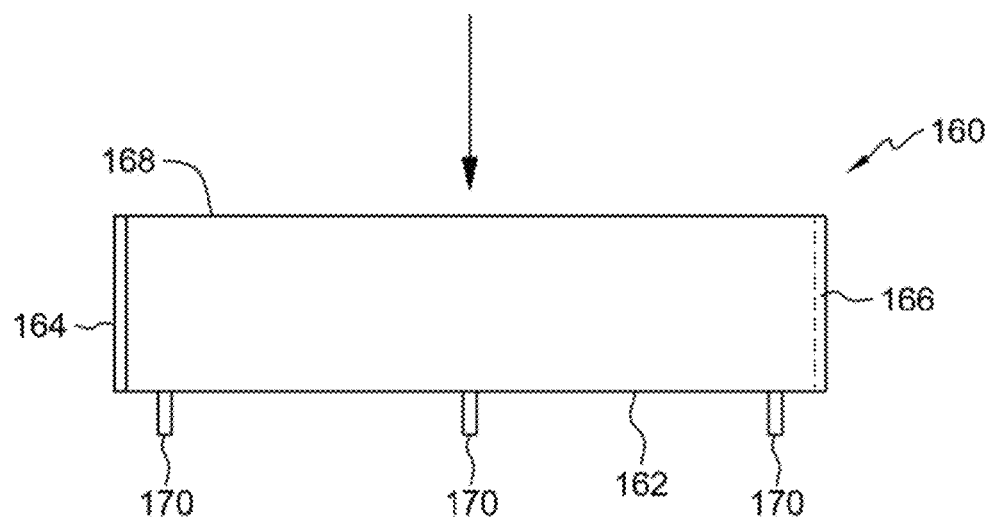
FIG. 3A depicts a dividing panel or bulkhead, adapted to be inserted and removed in various positions on the upper surface of the base of the the inventive truck bed slidable storage systems, in reliance upon dowel pins and tongues and grooves.
Figure 3B:
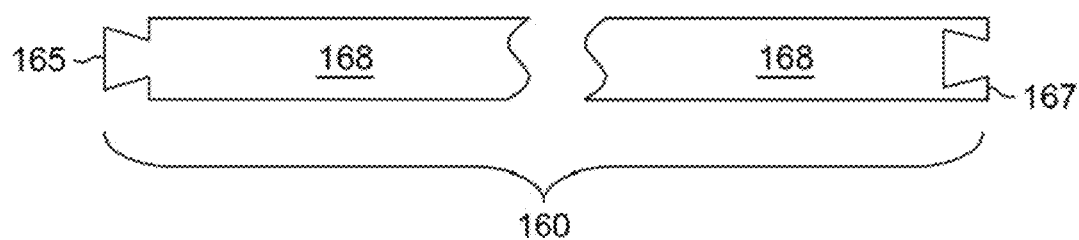
FIG. 3B depicts a top down view of the bulkhead, in the direction of the arrow seen in FIG. 3A, to highlight the respective tongues and grooves.

FIGS. 3A and 3B together present an exemplary dividing, panel or bulkhead 160, adapted to be inserted and removed in various positions to separate the internal volume into sub-volumes. As shown, dividing panels (bulkheads) 160 comprise a base-contact edge 162, an upper edge 168 opposite the base-contact edge, a left edge 164 and a right edge 166. Please note that the base-contact edge 162 is configured with one or more dowel pins 170 extending from the base-contact edge substantially in parallel with a planar front or back surface of the dividing panel. These dowel pins 170 are integral with or otherwise fixed to the base-contact edge and arranged thereon to fit into a plurality of bores 172 arranged in the substantially planar slidable base 110. The dowel pins detachably attach the dividing panels 160 to the slidable base 110. The bores 172 form a pattern of bores that provide a user with the ability to easily and readily switch or rearrange the panels 160 (and dowel pins 170), in and out, redefining the contours of the sub-spaces of the overall volume realized by the inventive system; the unused bores also act as drain holes. Preferably, all of the different parts or elements of the inventive system are made of plastic, such as HDPE.

In the embodiment shown in FIGS. 3A and 3B, the left edges 164 of the dividing panels (bulkheads) 160 are arranged as tongues and the opposing right edges 166 of the dividing panels are arranged as grooves; the tongues and grooves are complementarily shaped. The grooves receive the tongues of other dividing panels. Please note that the embodiments described are for exemplary purposes, and not meant to limit the scope of the invention as claimed.

Figure 4A:
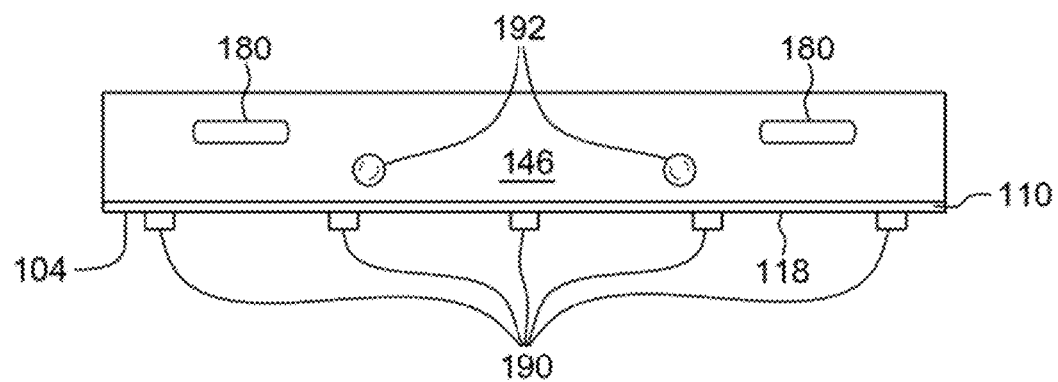
FIG. 4A depicts a rear plan view of the inventive the inventive ruck bed slidable storage system.
Figure 4B:
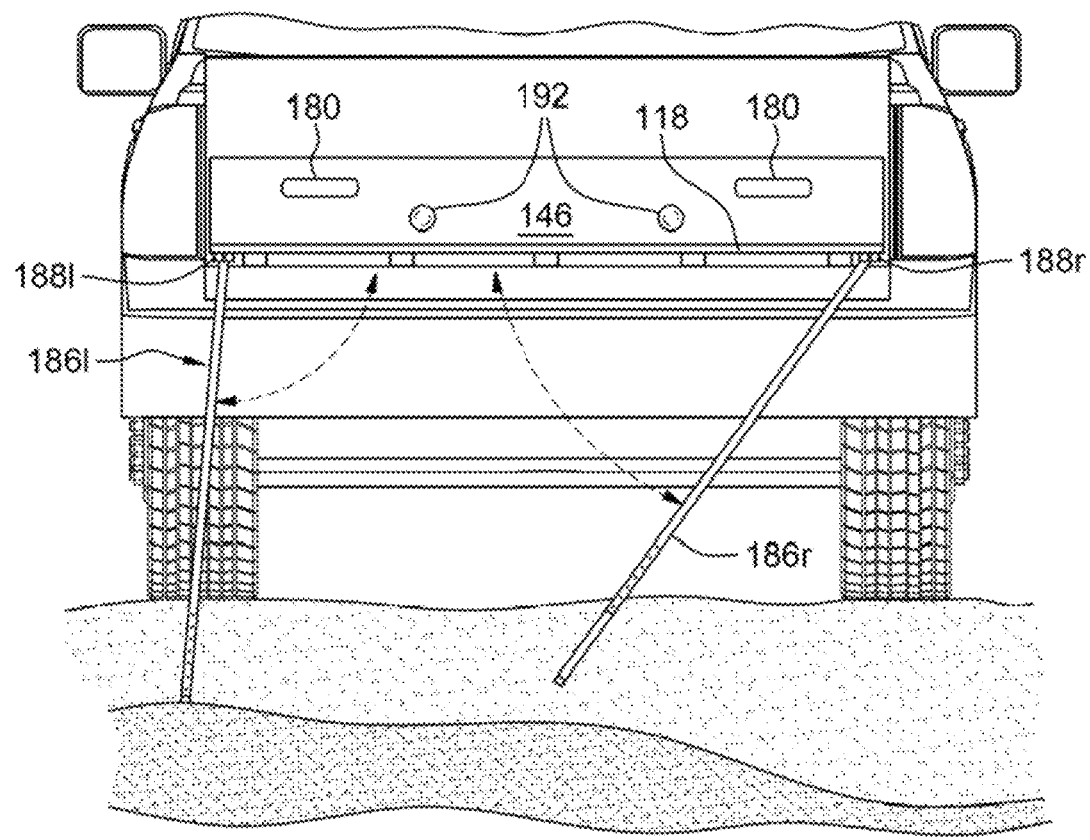
FIG. 4B depicts a rear plan view of the inventive the inventive truck bed slidable storage system positioned at the back of a pickup truck, with the rear tailgate wall in its down position.

FIG. 4A, 4B, highlight that the dividing panels (bulkheads) 160 include handles 180, or handle sections. The handles 160 operate as hand holds and bungee anchor points, for securing cargo in the internal volume. The base cab wall includes a runaway safety strap 182 (see FIG. 2) that is detachably fixed to the pick-up truck to limit the length that the rear access edge 118 of the substantially planar, slidable base 180 can move out past the rear tailgate wall.

For that matter, as the system including the slidable base 110 is slid out the back (past the tailgate wall) of the pickup truck, the slidable base is held, substantially level with the pickup truck bed, the weight pressing the held system up can increase significantly. To remedy this, the inventive system includes left and right support legs 186l, 166r, Left and right support legs 186l, 186r, are pivotably attached to the bottom surface 104 of the substantially planar, slidable base 100, in reliance upon low profile hinges 188l, 188r. The left and right support legs 186l, 186r are deployed to support part of the weight of the storage system base as it is slid out past the rear-access edge or rear tailgate wall. The support legs are deployed by pivoting ninety degrees. Please note that while the exemplary embodiment relies on the left and right support legs 186l, 186r and low profile hinges 188l, 188r, to support the storage system as it is slid out past the rear-access edge or rear tailgate wall, the invention is not limited thereto. The invention may rely on any means known to the skilled person for supporting the storage system as it is slid out past the rear-access edge or rear tailgate wall, and as it remains in such an extended position.

Also, the lower surface 104 of the substantially planar, slidable base 110 includes a plurality of runner strips 190 extending away from said lower surface for contacting and sliding on a surface of the pickup truck bed. Additionally, rubber bumpers 192 mounted on rear wall 146 prevent any shifting of the truck bed slidable storage system 100, while underway. The runner strips are made of high density polyethene plastic (HDPE). The limited contact area of the runner strips and their HDPE nature limit friction between the base and cab surface. The runner strips are between 1 and 2 inches in height; preferably, the runner strips are 1 and ½ inches in height. The substantially planar, slidable base also is preferably made of high density polyethene plastic (HDPE).

The base cab wall 140, first 142 and second 144 substantially opposing base sidewalk and base rear access wall 146 are made at least in part from materials selected from the group consisting of wood, metal, plastic and rubber, including high density polyethene plastic (HDPE). In one embodiment, the substantially planar, slidable base comprises peg board pattern. The fixed height (H) is between 8 and 15 inches, preferably 10 inches. Lock down blocks may be included to subdivide compartments and help prevent shifting of heavier or bulky items.

As will be evident to persons skilled in the art, the foregoing detailed description, applications and figures are presented as examples of the invention, and that variations are contemplated that do, not depart from the fair scope of the teachings and descriptions set forth in this disclosure.

What is claimed is:

1. A slidable storage system adapted for use in a truck bed of a pickup truck, the pickup truck bed arranged between a rearwardly-facing cab wall, first and second opposing substantially parallel vehicle sidewalls, a rear tailgate wall arranged opposite to and substantially in parallel with the rearwardly-facing cab wall, wherein the rear tailgate wall is hingedly attached to the pickup truck and arranged in a down position for access to the pickup truck bed and in an up position to limit access to the pickup truck bed, the slidable storage system comprising:

a substantially planar, slidable base formed with an upper surface and a lower surface, a cab-side edge, first and second opposing substantially parallel inner side edges of equal length (L1), separated from each other by a width ($W_t$), equal to a length of the cab-side edge, first and second opposing substantially parallel outer side edges of equal length (L2), separated from each other by a width ($W_O$), equal to a length of a rear-access edge opposite and substantially in parallel to the cab-side edge; and a base cab wall, first and second substantially opposing base sidewalls and a base rear access wall that each extend substantially perpendicularly up from the cab-side edge, the first and second substantially opposing parallel side edges and the rear-access edge, respectively, for a fixed height (H);

wherein, the substantially planar, slidable base, the base cab wall, the first and second substantially opposing inner and outer base sidewalls and the base rear-access wall form a storage volume;

wherein, the lower surface of the substantially planar, slidable base includes a plurality of runner strips arranged substantially in parallel to each other and the first and second opposing substantially parallel inner and outer side edges, and extending away from said lower surface for contacting and sliding on a surface of a pickup truck bed upon which the slidable base is arranged; and wherein the slidable base is positioned on the pickup truck bed and is slid backwards on the runner strips so that the rear-access edge passes the rear tailgate wall of the pickup truck for a limited distance, such that items stored on the slidable base are readily accessible and is slid forwards so the rear-access edge passes the rear tailgate wall allowing the rear tailgate wall to be raised to its up position.

2. The slidable storage system of claim 1, wherein, substantially planar, rectangular dividing panels, operating as bulkheads, are detachably mounted on the upper surface to separate portions of the storage volume.

3. The slidable storage system of claim 2, wherein, the dividing panels comprise a base-contact edge, an upper edge opposite the base-contact edge, a left edge and a right edge, wherein, the base-contact edge is configured with one or more dowel pins extending from the base-contact edge substantially in parallel with a plane of the dividing panel and wherein, the substantially planar slidable base includes a pattern of openings adapted to receive the one or more dowel pins to fix the dividing panels to the planar slidable base.

4. The slidable storage system of claim 3, wherein, the left edges of the dividing panels are arranged with tongues and the opposing right edges of the dividing panels are arranged with grooves for receiving like tongues of other dividing panels.

5. The slidable storage system of claim 1, wherein, the width of the cab-side edge (WI) and the rear access edge ($W_O$) are between 48 and 60 inches, and an aggregate length ($L_1$ and $L_2$) of the first and second substantially opposing inner and outer side edges is between 72 and 96 inches.

6. The slidable storage system of claim 5, wherein, the width of the cab-side edge ($W_I$) is 48 inches, the rear access edge ($W_O$) is 59 inches and the aggregate length ($L_1$ and $L_2$) of the first and second substantially opposing side edges is 72 inches.

7. The slidable storage system of claim 6, wherein, a width of the substantially planar, slidable base changes from the width of the cab-side edge ($W_I$) to the width of the rear access edge ($W_O$) at the first and second wheel-well structures.

8. The slidable storage system of claim 2, wherein the dividing panels include handle sections, which operate as hand holds and bungee anchor points.

9. The slidable storage system of claim 1, wherein, the base cab wall includes a runaway safety strap that is detachably fixed to the pick-up truck to limit the length that the rear access edge of the substantially planar, slidable base can move out past the rear tailgate wall.

10. The slidable storage system of claim 2, wherein, support legs are attached to the bottom surface of the substantially planar, slidable base, that are deployed to support the storage system as it is slid out past the rear-access edge or rear tailgate wall.

11. The slidable storage system of claim 10, wherein, the support legs are deployed by pivoting the support legs ninety degrees from each support leg's respective non-deployed position.

12. The slidable storage system of claim 1, wherein, the runner strips are made of high density polyethene plastic (HDPE).

13. The slidable storage system of claim 1, wherein, the runner strips are between 1 and 2 inches in height off the lower surface of the slidable base.

14. The slidable storage system of claim 1, wherein, the substantially planar, slidable base is made of high density polyethene plastic (HDPE).

15. The slidable storage system of claim 12, wherein, the base cab wall, first and second substantially opposing base sidewalls and base rear access wall are made at least in part from materials selected from the group consisting of wood, metal, plastic and rubber, including high density polyethene plastic (HDPE).

16. The slidable storage system of claim 1, wherein, the fixed height (H) is between 8 and 15 inches.

17. The slidable storage system of claim 1, wherein the substantially planar, slidable base comprises peg board.

18. The slidable storage system of claim 1, wherein, the first and second opposing substantially parallel inner and outer side edges of equal length ($L_1$, $L_2$) include first and second wheel-well structures extending towards a bed interior and each other.

* * * * *